No. 696,026. Patented Mar. 25, 1902.
J. P. B. FISKE.
BRICK DRIER.
(Application filed Jan. 23, 1901.)
(No Model.)
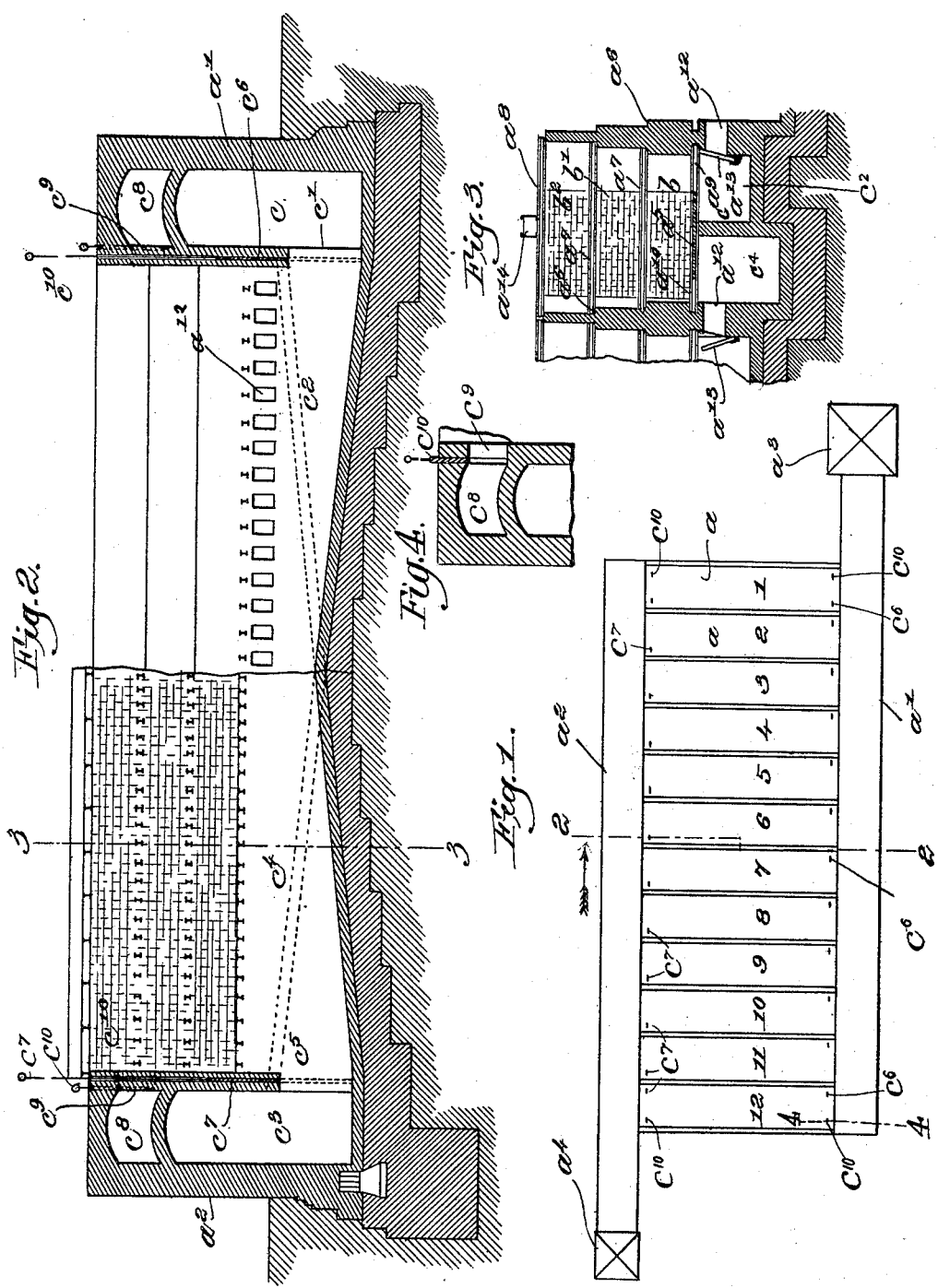
Witnesses.
Inventor.
Jonathan P. B. Fiske,

---

UNITED STATES PATENT OFFICE.

JONATHAN P. B. FISKE, OF NEWTON, MASSACHUSETTS.

BRICK-DRIER.

SPECIFICATION forming part of Letters Patent No. 696,026, dated March 25, 1902.

Application filed January 23, 1901. Serial No. 44,379. (No model.)

*To all whom it may concern:*

Be it known that I, JONATHAN P. B. FISKE, a citizen of the United States, residing at Newton, county of Middlesex, State of Massachusetts, have invented an Improvement in Brick-Driers, of which the following description, in connection with the accompanying drawings, is a specification, like characters on the drawings representing like parts.

My invention is an improved brick-drier for facilitating the convenience and economy of handling and drying green bricks, and has for its primary object the application to a drier of the continuous-kiln principle in such a way as to get the most work from the heat.

I have herein shown my invention as applied to the overhead system of handling bricks, as I believe this method is the most economical.

I will fully describe my invention and set forth the operation and various advantages thereof in the course of the following detailed description, reference being had to the accompanying drawings, in which I have illustrated a preferred embodiment of the invention.

In the drawings, Figure 1 is a diagrammatic top plan view of a drying-kiln built according to my invention. Fig. 2 is a transverse sectional view thereof, taken on the line 2 2, Fig. 1. Fig. 3 is a detail in longitudinal section taken on the line 3 3, Fig. 2; and Fig. 4 is a vertical cross-sectional view taken on the line 4 4, Fig. 1.

Referring to Fig. 1, it will be seen that I have provided a series of drying-chambers $a$, there being herein shown twelve thereof for convenience of illustration, numbered from 1 to 12, and at the opposite ends of these chambers and constituting the sides of the drier are flue-walls $a'$ $a^2$, containing flues or heat-passages $c$ $c^3$, the former leading from a furnace or other suitable source of heat $a^3$ and the latter leading, preferably, to a stack or chimney $a^4$. The chambers $a$ may be of any size and shape to suit the particular system of receiving and delivering the bricks, said chambers being herein shown as provided with a bottom $a^5$, onto which a stack or pile of green bricks $b$ may be lowered, and a series of ledges $a^6$, onto which grills or supporting-platforms $a^7$ may be lowered, together with successive stacks of bricks $b'$ $b^2$, the whole being closed in by a removable cover $a^8$. The bottom $a^5$ is solid, excepting at its opposite sides, where it has openings $a^9$ $a^{10}$ for the free inlet and outlet, respectively, of the hot air. The wall $a'$ has a flue or heat-supply passage $c$, which communicates, through openings $c'$, with, preferably, inclined branch passages or subways $c^2$, extending under the respective drying-chambers $a$, and the wall $a^2$ has a hot-air-exhaust passage $c^3$, into which the hot air from the chambers flows through a preferably-inclined passage or subway $c^4$ from each chamber opening into the chamber $c^3$ at $c^5$. The openings $c'$ $c^5$ are arranged to be closed by doors $c^6$ and $c^7$, respectively. Communication between the successive chambers may be had in any convenient manner, openings $a^{12}$ being shown for the purpose extending through the walls adjacent the bottoms thereof, which may be closed in any convenient manner, as by dampers $a^{13}$. Above the heat-passages, and preferably in each wall, are return-passages $c^8$, which communicate with the end chambers of the drier, as indicated at $c^9$, dampers $c^{10}$ being used to control the connection.

It will be understood that very many changes and modifications in details of arrangement and construction may be made while still embodying my invention in its broader features.

The operation of my improved drying-kiln is as follows: We will suppose that the first chamber has been dried and that the chambers 2 to 6 are being dried. The roof is taken off from the chamber 1 by a crane or other suitable lifting device engaging lifting-eyes $a^{14}$ for the purpose of removing the dried bricks therefrom. The door $c^6$ is opened from the passage $c$ into the subway of chamber 2, the other doors being closed. The dampers $a^{13}$ of chamber 2 are closed to prevent a back draft into chamber 1, thereby causing all the heated air from the passage $c$ to flow through the single opening $c'$ into the inclined subway $c^2$ and through the openings $a^9$ up into chamber 2, thence through the mass of bricks therein down through the exits $a^{10}$ in the bottom of said chamber, thence through the openings $a^{12}$ in the wall to the inclined subway of chamber 3, thence through the bricks in chamber 3 and out, as in the case of chamber 2, and so on through the successive chambers until the hot air reaches chamber 6. The openings $a^{12}$ between the subways of chambers 6 and 7 are closed and the door $c^7$ of the exit-subway $c^4$ of said chamber 6 is open, thereby permitting the hot air to flow from chamber 6 down the inclined exit subway or passage $c^4$ into the flue $c^3$ under the action of the stack or other draft-producer $a^4$. In other words, the circulation is from the furnace $a^3$ through the passage $c$ and opening $c'$, subway or passage $c^2$ into chamber 2, and thence through the successive chambers to that chamber which has open communication with the passage $c^3$, and thence out to the stack. The next chamber 7 having been filled with bricks and the chamber 2 sufficiently dried, the holes $a^{12}$ between chambers 2 and 3 are closed and between chambers 6 and 7 are opened, and chamber 7 is thrown into communication with the stack-passage $c^3$, whereupon the process already described for chambers 2 and 6 is continued for chambers 3 to 7, and so on with the successive chambers, one chamber being added and one dropped each time until chamber 12 is reached. When this chamber is reached and chamber 1 has been filled with green bricks, the holes $c^9$ from chambers 12 and 1 into the passages $c^8$ are opened, so that the heated air flows from the furnace $a^3$ through the supply-passage $c$ to, let us say, chamber 9, and thence into chambers 10, 11, and 12, and out into one or both of the return-passages $c^8$ and into chamber 1, from whence it flows down the inclined subway or passage $c^4$ beneath said chamber 1 and into the stack-flue or draft-passage $c^3$, as before. Thus it will be seen that a continuous rotation of removing the dried bricks, drying filled chambers, and filling empty chambers takes place without interruption of the heat circulation or waste and that at the same time the structure is extremely compact and well adapted to retain and utilize all the heat to the best advantage.

Having described my invention, what I claim, and desire to secure by Letters Patent, is—

1. An apparatus of the kind described, comprising a series of chambers, means for closing and opening communication between them, a heat-supply passage, means for opening communication from said passage with any of said chambers, as may be desired, branch passages, extending from said passage, underneath the bottoms of said chambers, said chambers having means permitting heat from said branch passages to pass freely thereinto, and means for creating a draft for causing the heat received from said passage to circulate properly through said chambers.

2. An apparatus of the kind described, comprising a series of chambers, means for closing and opening communication between them, a heat-supply passage, means for opening communication from said passage with any of said chambers, as may be desired, branch passages, extending from said passages, underneath the bottoms of said chambers, said chambers having means permitting heat from said branch passages to pass freely thereinto, and means for creating a draft for causing the heat received from said passage to circulate properly through said chambers, a return-passage for conducting the heat from the end of said series to the beginning thereof, and means for throwing said return-passage into or out of the circuit including said draft-creating means.

3. An apparatus of the kind described, comprising a series of chambers, means for closing and opening communication between them, a heat-supply passage, means for opening communication from said passage with any of said chambers, as may be desired, branch passages, extending from said passage, underneath the bottoms of said chambers, said chambers having means permitting heat from said branch passages to pass freely thereinto, a heat-exhaust passage, means for creating a draft for causing the heat received from said supply-passage to circulate properly, a return-passage for conducting the heat from the end of said series to the beginning thereof, and means for throwing said return-passage into or out of the circuit including said draft-creating means.

4. An apparatus of the kind described, comprising a series of communicating chambers arranged side by side and having heat-inlet passages extending beneath the bottoms of the respective chambers, and outlet-passages also extending beneath the said bottoms, heat-supplying means communicating with said inlet-passages, draft-creating means communicating with said outlet-passages, and means for bringing into action said heat-supply passage and draft-passage for any set of said chambers desired.

5. A kiln comprising a plurality of chambers arranged side by side in a longitudinal series, means for supplying and removing heat from any set of the chambers, as may be desired, and opposite return-flues extending transversely across the ends of the chambers and connecting the first and last chambers of the series at both ends and opposite sides of the kiln, and means for introducing said return-flues into the heat-circulation system when it is desired to include the first and last chambers in the set of chambers being operated.

6. A kiln comprising a plurality of chambers arranged in a longitudinal series and having heat-passages extending along the ends of said chambers at the sides of the kiln, branch passages extending from said first-mentioned passages beneath each chamber, said branch passages having their bottoms inclined from their respective heat-passages and extending past each other to the opposite end of the chamber.

7. A kiln comprising a plurality of chambers arranged side by side, and having a heat-circulation system for operating several chambers simultaneously, each chamber having its walls provided with ledges for removably receiving successive series of superposed stacks of bricks and their supporting-platforms.

In testimony whereof I have signed my name to this specification in the presence of two subscribing witnesses.

JONATHAN P. B. FISKE.

Witnesses:
GEO. H. MAXWELL,
GEO. W. GREGORY.